(12) United States Patent
Kawaguchi et al.

(10) Patent No.: US 7,390,759 B2
(45) Date of Patent: Jun. 24, 2008

(54) STEEL PLATE REINFORCING SHEET

(75) Inventors: Yasuhiko Kawaguchi, Osaka (JP); Katsuhiko Tachibana, Osaka (JP)

(73) Assignee: Nitto Denko Corporation, Osaka (JP)

( * ) Notice: Subject to any disclaimer, the term of this patent is extended or adjusted under 35 U.S.C. 154(b) by 36 days.

(21) Appl. No.: 11/600,148

(22) Filed: Nov. 16, 2006

(65) Prior Publication Data

US 2007/0110978 A1    May 17, 2007

(30) Foreign Application Priority Data

Nov. 17, 2005 (JP) .............................. 2005-333013
May 29, 2006 (JP) .............................. 2006-148732

(51) Int. Cl.
B32B 27/30 (2006.01)
(52) U.S. Cl. .................. 442/173; 442/180; 442/260; 428/418; 428/292.1
(58) Field of Classification Search ................. 442/173, 442/180, 260; 428/292.1, 418, 457; 296/181
See application file for complete search history.

(56) References Cited

U.S. PATENT DOCUMENTS

| | | | |
|---|---|---|---|
| 3,751,331 A * | 8/1973 | Dane et al. .................. 442/293 |
| 5,198,286 A * | 3/1993 | Kagoshima et al. .......... 442/370 |
| 5,290,878 A | 3/1994 | Yamamoto et al. |
| 6,291,374 B1 * | 9/2001 | Landi .......................... 442/237 |
| 7,267,870 B2 * | 9/2007 | Matsumoto et al. .......... 428/343 |
| 2005/0025955 A1 * | 2/2005 | Kuriu et al. ............... 428/304.4 |
| 2005/0032447 A1 * | 2/2005 | Tachibana et al. ........... 442/149 |
| 2005/0103422 A1 * | 5/2005 | Kawaguchi ................... 156/60 |
| 2005/0276984 A1 * | 12/2005 | Kagehisa et al. ............. 428/418 |
| 2007/0110978 A1 * | 5/2007 | Kawaguchi et al. ....... 428/292.1 |

FOREIGN PATENT DOCUMENTS

| | | |
|---|---|---|
| EP | 10504890 A2 * | 2/2005 |
| JP | H08-325349 | 12/1996 |
| JP | 2611717 | 2/1997 |
| JP | H11-193333 | 7/1999 |
| JP | H11-246827 | 9/1999 |

* cited by examiner

*Primary Examiner*—N Edwards
(74) *Attorney, Agent, or Firm*—Jean C. Edwards, Esq.; Akerman Senterfitt

(57) ABSTRACT

The invention provides a steel plate reinforcing sheet having light weight and thin layer, providing sufficient adhesion and reinforcing effect to a steel plate, and having excellent workability. In the steel plate reinforcing sheet comprising a restricting layer and a resin layer, a curing composition is first prepared by mixing rubber components comprising diene-based rubber and rubber having a vinyl group in its side chain, with a cross-linking agent capable of reacting with these rubber components, and then by kneading the mixture. Thereafter, the curing composition thus prepared is rolled by molding, to form a resin layer. Then, the resin layer thus formed is adhesively bonded to the restricting layer, to produce a steel plate reinforcing sheet.

9 Claims, 1 Drawing Sheet

STEEL PLATE REINFORCING SHEET

CROSS-REFERENCE TO RELATED APPLICATION

This application claims the priorities of Japanese Patent Application No. 2005-333013 filed on Nov. 17, 2005 and Japanese Patent Application No. 2006-148732 filed on May 29, 2006, the disclosure of which are incorporated herein by reference.

BACKGROUND OF THE INVENTION

1. Field of the Invention

The present invention relates to a steel plate reinforcing sheet and, more particularly, to a steel plate reinforcing sheet used to be adhesively bonded to steel plates used in a variety of industrial machines such as transportation machines.

2. Description of the Prior Art

In general, a steel plate for a shell of an automotive vehicle is manufactured in the form of a thin sheet having a thickness of generally in the range of 0.6 mm to 0.8 mm, for reduction in weight of a vehicle body. As is known, a steel plate reinforcing sheet comprising a restricting layer and a resin layer is adhesively bonded to the inside of the steel plate, to cure the resin layer, for the purpose of reinforcing the steel plate.

Generally, in such a steel plate, the steel plate reinforcing sheet is subjected to electrodeposition coating after the steel plate reinforcing sheet is adhesively bonded to it, so that the resin layer is cured by heating at the time of drying the coating.

This steel plate reinforcing sheet is known that a sheet-like resin layer formed of a thermally curable resin composition is laminated on a restricting layer formed of glass fiber cloth, thin metal sheet, and the like. As the thermally curable resin composition, epoxy resin composition (Cf. JP Laid-open (Unexamined) Patent Publication No. Hei 8-325349), and rubber-epoxy composition containing styrene-butadiene rubber, epoxy resin, and curing agent thereof (Cf. JP Laid-open (Unexamined) Patent Publication No. 11-246827) are proposed.

When these steel plate reinforcing sheets have a resin layer formed of epoxy resin composition, the reinforcing effect can be sufficient. However, the epoxy resin is a semisolid resin with low molecular weight, which is therefore highly temperature-sensitive. This property has disadvantages that use of the epoxy resin in a resin layer makes it difficult to peel off the resin layer from exfoliate paper, and also leads to low adhesion of the resin layer to the steel plate. In addition, there are disadvantages related to workability such as overflow of resin during storage and resin dripping during heat-curing.

On the other hand, in the rubber-epoxy composition, it is difficult to stably mix styrene-butadiene rubber with epoxy resin and is likely to produce a bloom of the epoxy resin. This makes the resin layer surface tacky, which induces the disadvantage of reduction in workability and handleability.

The steel plate reinforcing sheet whose resin layer consists of rubber-based material only has good workability but has low strength. In order to achieve satisfactory reinforcing effect, it is necessary to increase the thickness of the resin layer. However, such increase is likely to prevent the weight saving in the structure and cost reduction.

SUMMARY OF THE INVENTION

It is an object of the present invention to provide a new steel plate reinforcing sheet having light weight and thin layer, providing sufficient adhesion and reinforcing effect to a steel plate, and having excellent workability.

The steel plate reinforcing sheet of the present invention comprises a restricting layer and a resin layer, wherein the resin layer comprises diene-based rubber, rubber having a vinyl group in its side chain, and a cross-linking agent.

In the steel plate reinforcing sheet of the present invention, it is preferable that the rubber having a vinyl group in its side chain is contained at a ratio of not more than 50% by weight, per the total amount of the diene-based rubber and the rubber having a vinyl group in its side chain.

In the steel plate reinforcing sheet of the present invention, it is preferable that the diene-based rubber comprises styrene-butadiene rubber.

In the steel plate reinforcing sheet of the present invention, it is preferable that the diene-based rubber comprises styrene-butadiene rubber and liquid isoprene rubber.

In the steel plate reinforcing sheet of the present invention, it is preferable that the rubber having a vinyl group in its side chain comprises at least one compound selected from the group consisting of 1,2-butadiene rubber, 1,2-isoprene rubber, 3,4-isoprene rubber, copolymer of 1,2-butadiene and styrene, copolymer of 1,2-isoprene and styrene, and copolymer of 3,4-isoprene and styrene.

In the steel plate reinforcing sheet of the present invention, it is preferable that the restricting layer is formed of glass fiber cloth.

In the steel plate reinforcing sheet of the present invention, it is preferable that the weight average molecular weight of the diene-based rubber is not less than 20,000.

In the steel plate reinforcing sheet of the present invention, it is preferable that the weight average molecular weight of the liquid isoprene rubber ranges from 25,000 to 50,000.

In the steel plate reinforcing sheet of the present invention, it is preferable that the liquid isoprene rubber is contained at a ratio of not more than 40% by weight, per the total amount of the diene-based rubber and the rubber having a vinyl group in its side chain.

The steel plate reinforcing sheet of the present invention, which has light weight and thin layer, can compatibly satisfy both of excellent adhesion to a steel plate and excellent reinforcing effect of the same steel plate, ensuring excellent workability and handleability.

Figure 1:
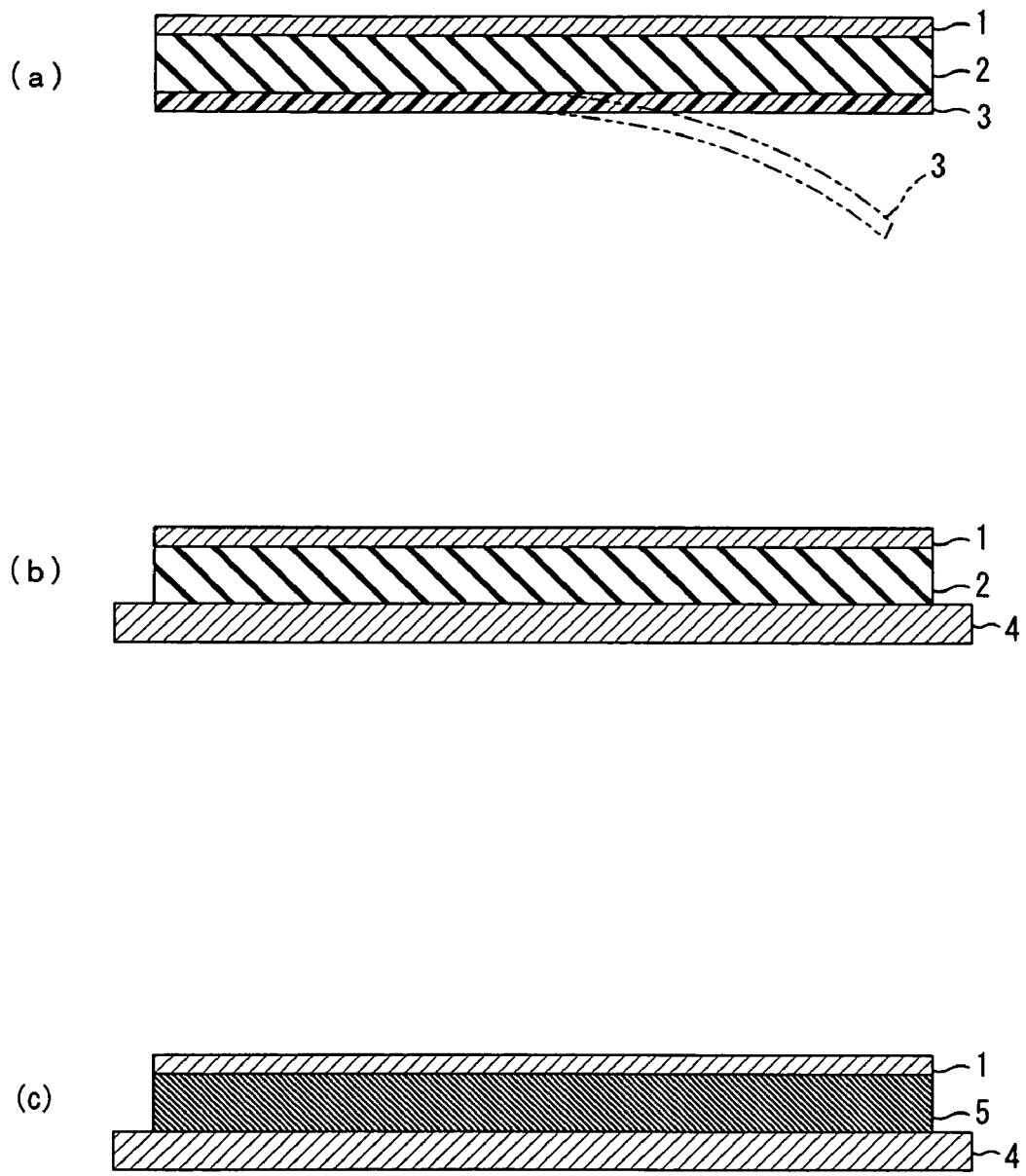
FIG. 1 is a process drawing showing one embodiment of a method of reinforcing a steel plate by using a steel plate reinforcing sheet of the present invention.

(a) illustrates the process of preparing a steel plate reinforcing sheet and peeling off an exfoliate paper from the same reinforcing sheet;

(b) illustrates the process of adhesively bonding the steel plate reinforcing sheet to a steel plate; and (c) illustrates the process of curing the steel plate reinforcing sheet by heating.

DETAILED DESCRIPTION OF THE PREFERRED EMBODIMENT

A steel plate reinforcing sheet of the present invention comprises a restricting layer and a reinforcing layer.

The restricting layer serves to provide toughness for a cured resin layer (hereinafter referred to as "curing layer"). It is preferable that the restricting layer is in the form of a sheet and has light weight and thin-film, which is formed of a material to be stuck firmly and integrally with the curing layer. The materials that may be used for the restricting layer include, for example, glass fiber cloth, resin-impregnated glass fiber cloth, nonwoven cloth, metal foil, and carbon fiber.

The glass fiber cloth is a cloth formed of glass fibers, and a known glass fiber cloth can be used. The resin-impregnated glass fiber cloth is obtained by impregnating the above-mentioned glass fiber cloth with synthetic resin such as thermosetting resin, or thermoplastic resin, and a known resin-impregnated glass fiber cloth can be used.

The thermosetting resins that may be used include, for example, epoxy resin, urethane resin, melamine resin, and phenol resin. The thermoplastic resins that may be used include, for example, vinyl acetate resin, ethylene vinyl acetate copolymer (EVA), vinyl chloride resin, and EVA-vinyl chloride resin copolymer. The thermosetting resin cited above and the thermoplastic resin cited above may be used in combination (e.g., combination of melamine resin and vinyl acetate resin).

The nonwoven cloth is obtained by sealing with fiber sheets, and a known nonwoven cloth can be used. As the nonwoven cloth, a resin-impregnated nonwoven cloth obtained by impregnating a nonwoven cloth with synthetic resin such as thermosetting resin or thermoplastic resin, can also be used.

The metal foils that maybe used include, for example, known metal foils such as an aluminum foil and a steel foil.

Of these materials cited above, the glass fiber cloth and the resin-impregnated glass fiber cloth are preferably used for the restricting layer, in terms of weight, degree of adhesion, strength, and cost.

The restricting layer has a thickness, for example, in the range of 0.05 to 1 mm, or preferably in the range of 0.1 to 0.5 mm.

The resin layer serves to be adhesively bonded to the restricting layer and stuck firmly and integrally with the restricting layer by curing, so that the steel plate can be reinforced. The resin layer which is in the form of a sheet is formed of a curing composition which can be cured by heating. This curing composition comprises at least diene-based rubber, rubber having a vinyl group in its side chain, and a cross-linking agent capable of reacting with these rubber components.

The diene-based rubber is a rubbery polymer comprising double bonds in its main chain, which is obtained by polymerization of a monomer having a diene structure. No particular limitation is imposed on the diene-based rubber. The diene-based rubbers that may be used include, for example, rubber in the form of a liquid or a solid, such as butadiene rubber (1,4-polybutadiene, the same applies to the following), isoprene rubber (1,4-polyisoprene, the same applies to the following), styrene-butadiene rubber, styrene-isoprene rubber, acrylonitrile-butadiene rubber, and ethylene-propylene-diene rubber. These diene-based rubbers may be used alone or in combination.

Of these diene-based rubbers, styrene-butadiene rubber, or combination of styrene-butadiene rubber and liquid isoprene rubber, is preferable in terms of reinforcement and adhesion to the steel plate. The styrene-butadiene rubber contains, for example, not more than 50% by weight of styrene, or preferably not more than 35% by weight of styrene.

The weight average molecular weight (polystyrene-converted value by GPC) of this diene-based rubber is not less than 20,000 or more, or preferably ranges from 25,000 to 100,000. The weight average molecular weight of less than 20,000 may induce reduction of adhesion of the steel plate reinforcing sheet, particularly to the steel plate.

Also, the Mooney viscosity of this diene-based rubber ranges, for example, from 20 to 60 (ML1+4, at 100° C.), or preferably from 30 to 50 (ML1+4, at 100° C.).

The mixing ratio of the diene-based rubber is for example not less than 50% by weight, or preferably in the range of 50 to 99% by weight, or more preferably 55 to 95% by weight, per the rubber components (total amount of the diene-based rubber and the rubber having a vinyl group in its side chain, and the same applies to the following). The mixing ratio of the diene-based rubber of less than this may induce brittleness of the resin layer due to relative increase of the mixing ratio of the rubber having a vinyl group in its side chain to be mentioned later, thereby reducing the displaced amount by bending at the maximum strength of the steel plate reinforcing sheet in some cases. On the other hand, the upper limit of the mixing ratio of the diene-based rubber is preferably 99% by weight, from the viewpoint of the strength of the steel plate reinforcing sheet.

When the styrene-butadiene rubber and the liquid isoprene rubber are used in combination as the diene-based rubber, a generally known liquid isoprene rubber can be used.

It is preferable that the weight average molecular weight (polystyrene-converted value by GPC) of the liquid isoprene rubber ranges, for example, from 25,000 to 50,000. Specifically, the liquid isoprene rubbers include, for example, liquid isoprene rubber under the trade name of "KURAPRENE LIR-30", or "KURAPRENE LIR-50" available from Kuraray Co., Ltd.

The content ratio of the liquid isoprene rubber is preferably not more than 40% by weight per the rubber components. When the content ratio thereof exceeds 40% by weight, the steel plate reinforcing sheet becomes tacky or has higher flowability during the sheet formation, so that there is a possibility to reduce handleability of the sheet.

When the styrene butadiene rubber and the liquid isoprene rubber are used in combination as diene-based rubber, there can be obtained a steel plate reinforcing sheet having high adhesion and excellent workability, in a wide temperature range from low to high. Moreover, the steel plate reinforcing sheet thus obtained also has excellent reinforcement and excellent strength after curing.

The rubber having a vinyl group in its side chain is a polymer having a vinyl group (an iso propenyl group is included, and the same applies to the following) in its side chain. No particular limitation is imposed on the rubber. For example, rubber in the form of a liquid or a solid may be used such as 1,2-butadiene rubber, 1,2-isoprene rubber, 3,4-isoprene rubber, copolymer of 1,2-butadiene and styrene, copolymer of 1,2-isoprene and styrene, and copolymer of 3,4-isoprene and styrene. These rubbers having a vinyl group in its side chain may be used alone or in combination.

The 1,2-butadiene rubber is a polymer of 1,3-butadiene, with a portion (1,2-polybutadiene) having a repeating unit of vinylethylene in the molecule. The 1,2-isoprene rubber is a polymer of isoprene, with a portion (1,2-polyisoprene) having a repeating unit of 1-methyl-1-vinylethylene in the molecule. The 3,4-isoprene rubber is a polymer of isoprene, with a portion (3,4-polyisoprene) having a repeating unit of isopropenyl ethylene in the molecule.

The copolymer of 1,2-butadiene and styrene is, for example, a block copolymer comprising a polystyrene block and a 1,2-polybutadiene block (e.g., styrene-1,2-butadiene block copolymer, styrene-1,2-butadiene-styrene block copolymer, etc.).

The copolymer of 1,2- or 3,4-isoprene and styrene is, for example, a block copolymer comprising a polystyrene block and a 1,2- or 3,4-isoprene block (e.g., a styrene-1,2- or -3,4- isoprene block copolymer, a styrene-1,2- or -3,4-isoprene styrene block copolymer, etc.).

Each of the 1,2-polybutadiene, 1,2-polyisoprene, and 3,4-polyisoprene in the rubber having a vinyl group in its side chain has a vinyl bond content of not less than 80%, or preferably not less than 90%.

Of these rubbers having a vinyl group in its side chain, each of the copolymer of 1,2-butadiene and styrene, and the copolymer of 1,2- or 3,4-isoprene and styrene has a styrene content of, for example, not more than 50% by weight, or preferably from 35 to 5% by weight.

Specific examples of the 1,2-butadiene rubber include, for example, "RB series" (product numbers of "RB810", "RB820", and "RB830") available from JSR Corporation.

Specific examples of the copolymer of 3,4-isoprene and styrene include, for example, "HYBRAR (registered trademark) series" (product numbers of "5127" and "5125") available from Kuraray Co., Ltd.

The mixing ratio of the rubber having a vinyl group in its side chain is, for example, not more than 50% by weight, or preferably in the range of 1 to 50% by weight, or more preferably 5 to 45% by weight, per the rubber components. The mixing ratio of the rubber having a vinyl group in its side chain of more than this may induce increase of the strength of the steel plate reinforcing sheet, but may induce brittleness of the resin layer, thereby reducing the displaced amount by bending at the maximum strength of the steel plate reinforcing sheet in some cases. On the other hand, the lower limit of the mixing ratio of the rubber having a vinyl group in its side chain is preferably 1% by weight, from the viewpoint of the strength of the steel plate reinforcing sheet.

No particular limitation is imposed on the cross-linking agent. For example, a known cross-linking agent (a vulcanizing agent) capable of reacting with the diene-based rubber and, or the rubber having a vinyl group in its side chain by heating, thereby allowing to cross-link these rubber components, can be used as the cross-linking agent. The cross-linking agents that may be used include, for example, sulfur (e.g., powdered sulfur, insoluble sulfur, surface treated sulfur, precipitated sulfur, colloidal sulfur, etc.), sulfur compounds, selenium, organic peroxides (e.g., dicumyl peroxide, 1,1-bis (tert-butyl-peroxy)-3,3,5-trimethylcyclohexane, 2,5-dimethyl-2,5-ditert-butyl-peroxyhexane, 2,5-dimethyl-2,5-di-tert-butyl-peroxyhexane, 1,3-bis(tert-butyl-peroxyisopropyl) benzene, tert-butyl-peroxyketone, tert-butyl-peroxybenzoate, etc.), polyamines, oximes (e.g., p-quinone dioxime, p,p'-dibenzoyl quinone dioxime, etc.), nitroso compounds (e.g., p-dinitroso benzene, etc.), and resins (e.g., alkyl phenol resin, alkyl phenol formaldehyde resin, melamine-formaldehyde condensate, etc.).

These cross-linking agents may be used alone or in combination. Of these cross-linking agents, sulfur is preferably used in terms of the curing property and the reinforcement.

The mixing ratio of the cross-linking agent is, for example, in the range of 1 to 50 parts by weight, or preferably 2 to 30 parts by weight, per 100 parts by weight of the rubber components. The mixing ratio of the cross-linking agent of less than this may induce reduction in reinforcement. On the other hand, the mixing ratio of the cross-linking agent of more than this may induce reduction of adhesion of the steel plate reinforcing sheet, and cost-defectiveness.

In addition to the rubber components and cross-linking agent cited above, if desired, the curing composition may contain, for example, a cross-linking accelerator, a cross-linking auxiliary agent, a foaming agent, a foam auxiliary agent, a filler, a tackifier, a lubricant, and a softening agent.

No particular limitation is imposed on the cross-linking accelerator (vulcanizing accelerator). The cross-linking accelerators that may be used include, for example, dithiocarbamic acid salts, thiazoles, guanidines, sulfenamides, thiurams, xanthogenic acid salts, aldehyde ammonias, aldehyde amines, and thioureas. These cross-linking accelerators may be used alone or in combination. The mixing ratio of the cross-linking accelerator is, for example, in the range of 1 to 20 parts by weight, or preferably 3 to 15 parts by weight, per 100 parts by weight of the rubber components.

No particular limitation is imposed on the cross-linking auxiliary agent (vulcanizing auxiliary agent). The cross-linking auxiliary agents that may be used include, for example, zinc oxide and magnesium oxide. These cross-linking auxiliary agents may be used alone or in combination. The mixing ratio of the cross-linking auxiliary agent is, for example, in the range of 1 to 30 parts by weight, or preferably 3 to 20 parts by weight, per 100 parts by weight of the rubber components.

The foaming agents that may be used include, for example, an inorganic foaming agent and an organic foaming agent.

The inorganic foaming agents that may be used include, for example, ammonium carbonate, ammonium hydrogen carbonate, sodium hydrogen carbonate, ammonium nitrite, sodium borohydride, and azides.

The organic foaming agents that may be used include, for example, a N-nitroso compound (N,N'-dinitrosopentamethylenetetramine, N,N'-dimethyl-N,N'-dinitrosoterephthalamide, etc.), an azoic compound (e.g., azobis isobutyronitrile, azodicarboxylic amide, barium azodicarboxylate, etc.), alkane fluoride (e.g., trichloromonofluoromethane, dichloromonofluoromethane, etc.), a hydrazine compound (e.g., paratoluene sulfonyl hydrazide, diphenylsulfone-3,3'-disulfonyl hydrazide, 4,4'-oxybis(benzene sulfonyl hydrazide), allylbis(sulfonyl hydrazide), etc.), a semicarbazide compound (e.g., p-toluylenesulfonyl semicarbazide, 4,4'-oxybis (benzene sulfonyl semicarbazide, etc.), and a triazole compound (e.g., 5-morphoryl-1,2,3,4-thiatriazole, etc.).

The foaming agents may be in the form of thermally expansible microparticles comprising microcapsules formed by encapsulating thermally expansive material (e.g., isobutane, pentane, etc.) in a microcapsule of thermoplastic resin, (such as vinylidene chloride, acrylonitrile, acrylic ester and methacrylic ester). Commercially available products, such as Microsphere (R) (available from Matsumoto Yushi-Seiyaku Co., Ltd.), maybe used as the thermally expansible microparticles.

These may be used alone or in combination. Of these foaming agents, 4,4'-oxybis(benzene sulfonyl hydrazide) (OBSH) is preferably used in terms of less susceptible to external factors and foaming stability.

The mixing ratio of the foaming agent is, for example, in the range of 0.1 to 10 parts by weight, or preferably 0.5 to 5 parts by weight, per 100 parts by weight of the rubber components. The mixing ratio of the foaming agent of less than that may induce insufficient foaming, so that it causes reduction in thickness and thus in reinforcement of the steel plate reinforcing sheet. On the other hand, the mixing ratio of the foaming agent of more than that may induce reduction of density and thus in reinforcement of the steel plate reinforcing sheet.

The foam auxiliary agents that may be used include, for example, zinc stearate, a urea compound, a salicyclic compound, and a benzoic compound. These foam auxiliary agents may be used alone or in combination. The mixing ratio of the foam auxiliary agent is, for example, in the range of 0.5 to 10 parts by weight, or preferably 1 to 5 parts by weight, per 100 parts by weight of the rubber components.

The fillers that may be used include, for example, calcium carbonate (e.g., calcium carbonate heavy, calcium carbonate light, and Hakuenka® (colloidal calcium carbonate), etc.), talc, mica, clay, mica powder, bentonite, silica, alumina, aluminium hydroxide, aluminum silicate, magnesium hydroxide, titanium oxide, carbon black (e.g., acetylene black, etc.) and aluminum powder. These fillers may be used alone or in combination. The mixing ratio of the filler is, for example, in the range of 50 to 300 parts by weight, or preferably 75 to 200 parts by weight, per 100 parts by weight of the rubber components.

The tackifiers that may be used include, for example, rosin resin, rosin esters, terpene resin (e.g., terpene-aromatic liquid resin, polyterpene resin, etc.), cumarone-indene resin, and petroleum resin (e.g., C5/C9 petroleum resin, etc.), phenol-formalin resin, and xylene-formalin resin. These tackifiers may be used alone or in combination. The mixing ratio of the tackifier is, for example, in the range of 10 to 200 parts by weight, or preferably 20 to 150 parts by weight, per 100 parts by weight of the rubber components.

The lubricants that may be used include, for example, stearic acid and metal salts of stearic acid. These lubricants may be used alone or in combination. The mixing ratio of the lubricant is, for example, in the range of 0.1 to 10 parts by weight, or preferably 0.5 to 5 parts by weight, per 100 parts by weight of the rubber components.

The softening agents that may be used include, for example, various oils such as vegetable oil, naphthene oil, fatty oil, pine oil, tall oil, and mineral oil. These softening agents may be used alone or in combination. The mixing ratio of the softening agent is, for example, in the range of 1 to 100 parts by weight, or preferably 5 to 75 parts by weight, per 100 parts by weight of the rubber components.

In addition to the components cited above, further, if desired, the curing composition for forming the above-mentioned resin layer may contain in a proper portion known additive, such as, for example, a coloring agent (e.g., pigment, etc.), a thixotropic agent (e.g., montmorillonite, etc.), an anti-scorching agent, a stabilization agent, a plasticizer, an anti-aging agent (e.g., amine-ketone-containing antiaging agent, aromatic secondary amine-containing antiaging agent, phenol-containing antiaging agent, benzimidazole-containing antiaging agent, thiourea-containing antiaging agent, phosphorous acid-containing antiaging agent, etc.), an antioxidant, an ultraviolet absorber, a mildewproofing agent, and a fire retardant.

The curing composition can be prepared in the form of kneaded material which has been homogeneously mixed by blending the components cited above in the mixing ratios specified above and kneading them by using a mixing roll, a pressure kneader, a Banbury mixer, or an extruder, for example, though not limited thereto.

It is preferable that the kneaded material thus obtained is prepared so as to have a flow tester viscosity (60° C., 24 kg load), for example, in the range of 1,000 to 5,000 Pa·s, or preferably in the range of 1,500 to 4,000 Pa·s.

Thereafter, the kneaded material thus obtained is rolled, for example, by calendaring, extrusion or press molding under temperature under which the foaming agent is not substantially decomposed while mixed therein, to form a resin layer, though this is not particularly limitative.

Then, the resin layer thus formed is adhesively bonded to the restricting layer, to produce a steel plate reinforcing sheet.

The resin layer formed in this manner has a thickness, for example, in the range of 0.5 to 3 mm, or preferably in the range of 0.6 to 2 mm.

If desired, an exfoliate paper may be stuck on the surface of the resin layer of the steel plate reinforcing sheet thus produced.

In the steel plate reinforcing sheet thus obtained, a foaming ratio of the curing composition ranges preferably from 1.5 to 4.0 times, or more preferably from 2 to 3.5 times, when foamed, though not limited thereto. A density of the foam prepared by foaming the curing composition (weight (g) of the foam/volume of the foam ($cm^3$)) is in the range of preferably 0.2 to 0.8 $g/cm^3$, or more preferably in the range of 0.3 to 0.7 $g/cm^3$, though not limited thereto.

In the steel plate reinforcing sheet of the present invention, the total thickness of the restricting layer and resin layer thus adhesively bonded together is set to be in the range of 0.6 to 4 mm, or preferably in the range of 0.7 to 3 mm. The total thickness of the both layers of more than 4 mm may induce increase in thickness and weight, thus inducing cost-defectiveness. On the other hand, the total thickness of less than 0.6 mm may induce insufficient reinforcement.

The steel plate reinforcing sheet of the present invention thus obtained is adhesively bonded to the steel plate used in a variety of industrial machines such as transportation machines, to be used for the reinforcement purpose. To be more specific, as shown in FIG. 1(a), the steel plate reinforcing sheet of the present invention is formed by laminating the resin layer 2 on the restricting layer 1 and, if desired, the exfoliate paper 3 is stuck on the surface of the resin layer 2. In use, the exfoliate paper 3 is stripped from the surface of the resin layer 2, as indicated by a phantom line, first. Then, the surface of the resin layer 2 is adhesively bonded to the steel plate 4, as shown in FIG. 1(b). Thereafter, the resulting lamination is heated at a prescribed temperature (e.g., 160 to 210° C.) to cross-link and to cure, and further, if desired, to foam the resin layer 2, to thereby form the curing layer 5, as shown in FIG. 1(c).

This steel plate reinforcing sheet of the present invention can be suitably applied for reinforcement of a steel panel of a shell of an automobile for which weight saving is required. In this application to the automotive vehicle, the steel plate reinforcing sheet is adhesively bonded to the steel panel, first, in an assembling process of the steel panel of the shell of the automobile, for example. Then, the steel plate reinforcing sheet adhesively bonded to the steel panel is heated, cross-linked and cured, and further, if desired, foamed, by using the heat generated at the time of the electrodeposition coating, to thereby form the curing layer.

Accordingly, the steel plate reinforcing sheet of the present invention, which has light weight and thin layer, can compatibly satisfy both of excellent adhesion to a steel plate and excellent reinforcing effect of the same steel plate, ensuring excellent workability and handleability.

EXAMPLES

While in the following, the present invention will be described in further detail with reference to Examples and Comparative Examples, the present invention is not limited to any of them.

Examples 1 to 4 and Comparative Example 1

Each of the components was blended according to the blending formulation shown in TABLE 1, and the blended components were kneaded by a mixing roll, to prepare a kneaded material. In this kneading process, the diene-based rubber, the rubber having a vinyl group in its side chain, the filler (insulative), the tackifier, the lubricant, and the softening agent were first kneaded by a mixing roll which was heated at 120° C. Then, the kneaded mixture was cooled to the range of 50 to 80° C. Further, the cross-linking agent, the cross-linking accelerator, the cross-linking auxiliary agent, and the foaming agent were added thereto, and the added mixture was kneaded by the mixing roll, to give a kneaded material (a curing composition). Subsequently, the resulting kneaded material was rolled in the form of a sheet by press molding, and the rolled sheet was laminated on the surface of the exfoliate paper, to form a resin layer having a thickness of 0.6 mm.

Then, the restricting layer formed of the glass fiber cloth having a thickness of 0.2 mm was adhesively bonded to the other side of the resin layer opposite to the side thereof on which the exfoliate paper was laminated, by using a heat press, to produce a steel plate reinforcing sheet having the total thickness of the resin layer and the restricting layer of 0.8 mm.

Comparative Example 2

According to the blending prescription shown in TABLE 1, the epoxy resin and the filler (insulative) were first kneaded by a mixing roll which was heated at 120° C. Then, the kneaded mixture was cooled to the range of 50 to 80° C. Further, the foaming agent and the epoxy curing agent were added thereto, and the added mixture was kneaded by the mixing roll, to give a kneaded material (a curing composition). Subsequently, the same procedures as in Example 1 were carried out except that the resulting kneaded material was used, to produce a steel plate reinforcing sheet (0.8 mm in thickness).

(Evaluation)

As to the steel plate reinforcing sheets obtained in each of Examples and Comparative Examples, the workability before curing of the resin layer and the foaming ratio and reinforcement after curing of the resin layer were evaluated in the following manner. The results are shown in TABLE 1.

(1) Workability

As to the steel plate reinforcing sheets obtained in each of Examples and Comparative examples, the peeling property and adhesiveness at the time of peeling off the exfoliate paper were evaluated by the texture under the respective temperature conditions (5° C., 23° C., and 40° C.). Only the steel plate reinforcing sheet of which both the peeling property and adhesiveness were satisfactory was evaluated as "good".

(2) Adhesion

In each of Examples and Comparative Examples, the steel plate reinforcing sheet was cut into pieces having a width of 25 mm and a length of 150 mm, and the adhesion thereof to a stainless steel plate was measured under the respective temperature conditions (5° C., 23° C., and 40° C.). The adhesion was measured under the conditions of a tensile angle of 90° and a tensile speed of 50 mm/min.

The adhesion of not less than 20 N/25 mm is sufficient in practical use of the steel plate reinforcing sheet. However, the larger the adhesion is, the more advantageous it is to use the steel plate reinforcing sheet, particularly, in portions which are frequently subjected to vibration and impact.

(3) Foaming Ratio and Reinforcement

In each of Examples and Comparative Examples, the steel plate reinforcing sheet was cut into pieces having a width of 25 mm and a length of 150 mm, and then the exfoliate paper was peeled off therefrom. Each of the pieces of the steel plate reinforcing sheet was adhesively bonded to a cold-rolled steel plate (SPCC-SD available from Nippon Testpanel Co., Ltd.) having a width of 25 mm, a length of 150 mm, and a thickness of 0.8 mm, under an atmosphere at 20° C. Then, each of the bonded sheet piece was heated at 180° C. for 20 minutes, to foam and cure the resin layer. The test pieces were obtained in this manner. The foaming ratios of the each steel plate reinforcing sheet are shown in TABLE 1.

Thereafter, each of the test pieces after foaming and curing was supported with a span of 100 mm, with the steel plate up, and a testing bar was then moved down on a lengthwise center portion of the test piece from above in a vertical direction at a compression rate of 1 mm/min, and was pressed down against the steel plate until the curing layer was bent or displaced. When the curing layer was bent by 1 mm and then bent by 2 mm, each of the bending strength (N/25 mm) was evaluated as the reinforcement.

TABLE 1

| | | | Example/Comparative Example | | | | | |
|---|---|---|---|---|---|---|---|---|
| | | | Ex. 1 | Ex. 2 | Ex. 3 | Ex. 4 | Comp. Ex. 1 | Comp. Ex. 2 |
| <Curing Composition> Unit: w/t | | | | | | | | |
| Diene-based rubber | | SBR | 70 | 80 | 75 | 50 | 100 | — |
| | Liquid | LIR-30 | — | — | 15 | — | — | — |
| | isoprene | LIR-50 | — | — | — | 35 | — | — |
| Polymer having a vinyl | 1,2-BR | | 30 | — | — | — | — | — |
| group in its side chain | SIS (3,4-IR) | | — | 20 | 10 | 15 | — | — |
| Epoxy resin | #828 | | — | — | — | — | — | 80 |
| | #1001 | | — | — | — | — | — | 20 |
| Filler | Calcium carbonate heavy | | 50 | 50 | 70 | 70 | 50 | — |
| | Talc | | 50 | 50 | 50 | 50 | 50 | 100 |
| | Carbon black | | 4 | 4 | 4 | 4 | 4 | 10 |
| Cross-linking agent | Finely powdered sulfur | | 20 | 20 | 20 | 20 | 20 | — |
| Cross-linking | Thiazole base | | 5 | 5 | 5 | 5 | 5 | — |
| accelerator | Thiuram base | | 5 | 5 | 5 | 5 | 5 | — |
| Cross-linking | Zinc oxide | | 5 | 5 | 5 | 5 | 5 | — |
| auxiliary agent | | | | | | | | |
| Foaming agent | OBSH | | 2 | 2 | 2 | 2 | 2 | 2 |
| Tackifier | Petroleum resin | | 65 | 65 | 65 | 65 | 65 | — |
| Lubricant | Stearic acid | | 1 | 1 | 1 | 1 | 1 | — |
| Softening agent | Naphthene oil | | 25 | 25 | — | — | 25 | — |
| Epoxy curing agent | Dicyandiamide | | — | — | — | — | — | 5 |

TABLE 1-continued

|  |  | Ex. 1 | Ex. 2 | Ex. 3 | Ex. 4 | Comp. Ex. 1 | Comp. Ex. 2 |
|---|---|---|---|---|---|---|---|
| <Evaluation> | | | | | | | |
| Workability | 5° C. | Good | Good | Good | Good | Good | Not adhesive |
|  | 23° C. | Good | Good | Good | Good | Good | Good |
|  | 40° C. | Good | Good | Good | Good | Good | Not peelable |
| Adhesion | 5° C. | 25 | 25 | 40 | 50 | 30 | 0 |
| N/25 mm | 23° C. | 40 | 50 | 80 | 82 | CF | 25 |
|  | 40° C. | CF | CF | CF | CF | CF | — |
| Expansion ratio | (times) | 2.2 | 2.2 | 2.6 | 2.6 | 2.2 | 2.3 |
| Reinforcement | Strength at 1 mm displacement (N) | 21 | 25 | 30 | 32 | 12 | 35 |
|  | Strength at 2 mm displacement (N) | 33 | 41 | 56 | 60 | 21 | 68 |

Abbreviations and the like in TABLE 1 are given below.

SBR: Styrene-butadiene rubber, under the trade name of "Tufdene (registered trademark) 2003", with styrene content of 25%, and Mooney viscosity of 35 (ML1+4, at 100° C.), available from Asahi Kasei Corporation.

LIR-30: Liquid isoprene rubber, under the trade name of "KURAPRENE LIR-30", with weight average molecular weight of 29,000, available from Kuraray Co., Ltd.

LIR-50: Liquid isoprene rubber, under the trade name of "KURAPRENE LIR-50", with weight average molecular weight of 47,000, available from Kuraray Co., Ltd.

1,2-BR: 1,2-Butadiene rubber, under the trade name of "JSR RB820", with vinyl bond content of 92%, MFR of 3 g/10 min (150° C., 2.16 kg), melting point of 95° C., and specific gravity of 0.91, available from JSR Corporation SIS (3,4-IR): Styrene-3,4-isoprene-styrene block copolymer, under the trade name of "HYBRAR (registered trademark) 5127", with styrene content of 20%, MFR of 5 g/10 min (190° C., 2.16 kg), glass transition temperature of 8° C., and specific gravity of 0.94, available from Kuraray Co., Ltd.

828: Bisphenol A type epoxy resin, under the trade name of "EPIKOTE (registered trademark) 828", with epoxy equivalent of 180 g/eqiv., available from Japan Epoxy Resins Co., Ltd.

1001: Bisphenol A type epoxy resin, under the trade name of "EPIKOTE (registered trademark) 1001", with epoxy equivalent of 480 g/eqiv., available from Japan Epoxy Resins Co., Ltd.

Carbon black: Insulative carbon black, under the trade name of "Asahi 50", available from Asahi Carbon Co., Ltd.

Thiazole base: 2-Mercaptobenzothiazole, under the trade name of "NOCCELER M", available from OUCHISHINKO CHEMICAL INDUSTRIAL CO., LTD.

Thiuram base: Tetramethylthirammonosulfide, under the trade name of "NOCCELER TS", available from OUCHISHINKO CHEMICAL INDUSTRIAL CO., LTD.

OBSH: 4,4'-oxybis(benzene sulfonyl hydrazide), under the trade name of "NEOCELLBORN (registered trademark) N#1000S", available from EIWA CHEMICAL IND. CO., LTD.

Petroleum resin: under the trade name of "Escorez (registered trademark) 1202", available from Tonex Co., Ltd.

Naphthene oil: under the trade name of "NS100" available from Idemitsu Kosan Co., Ltd.

In TABLE 1, "CF" in the "adhesion" column means that cohesive failure has occurred in the steel plate reinforcing sheet.

As shown in TABLE 1, Comparative Example 1 using SBR provided good results in workability but provided poor results in reinforcement; and Comparative example 2 using epoxy resin provided good results in reinforcement but provided poor results in workability.

In contrast to this, Examples 1 and 2 provided good results in both workability and reinforcement.

Examples 3 and 4 in which styrene-butadiene rubber and liquid isoprene rubber were used in combination as diene-based rubber, provided in high adhesion, resulting in improvement of the reliability during the process of adhesively bonding the steel plate reinforcing sheet to the steel plate. And, the reinforcement after curing was dramatically improved, resulting in demonstration of the satisfactory characteristics as a steel plate reinforcing sheet.

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. A steel plate reinforcing sheet comprising a restricting layer and a resin layer,
   wherein the resin layer comprises diene-based rubber, rubber having a vinyl group in its side chain, and a cross-linking agent.

2. The steel plate reinforcing sheet according to claim 1, wherein the rubber having a vinyl group in its side chain is contained at a ratio of not more than 50% by weight, per a total amount of the diene-based rubber and the rubber having a vinyl group in its side chain.

3. The steel plate reinforcing sheet according to claim 1, wherein the diene-based rubber comprises styrene-butadiene rubber.

4. The steel plate reinforcing sheet according to claim 1, wherein the diene-based rubber comprises styrene-butadiene rubber and liquid isoprene rubber.

5. The steel plate reinforcing sheet according to claim 1, wherein the rubber having a vinyl group in its side chain comprises at least one compound selected from the group consisting of a 1,2-butadiene rubber, a 1,2-isoprene rubber, a 3,4-isoprene rubber, a copolymer of 1,2-butadiene and styrene, a copolymer of 1,2-isoprene and styrene, and a copolymer of 3,4-isoprene and styrene.

6. The steel plate reinforcing sheet according to claim 1, wherein the restricting layer is formed of glass fiber cloth.

7. The steel plate reinforcing sheet according to claim 1, wherein the weight average molecular weight of the diene-based rubber is not less than 20,000.

8. The steel plate reinforcing sheet according to claim 4, wherein the weight average molecular weight of the liquid isoprene rubber ranges from 25,000 to 50,000.

9. The steel plate reinforcing sheet according to claim 4, wherein the liquid isoprene rubber is contained at a ratio of not more than 40% by weight, per a total amount of the diene-based rubber and the rubber having a vinyl group in its side chain.

* * * * *